United States Patent Office 3,550,197
Patented Dec. 29, 1970

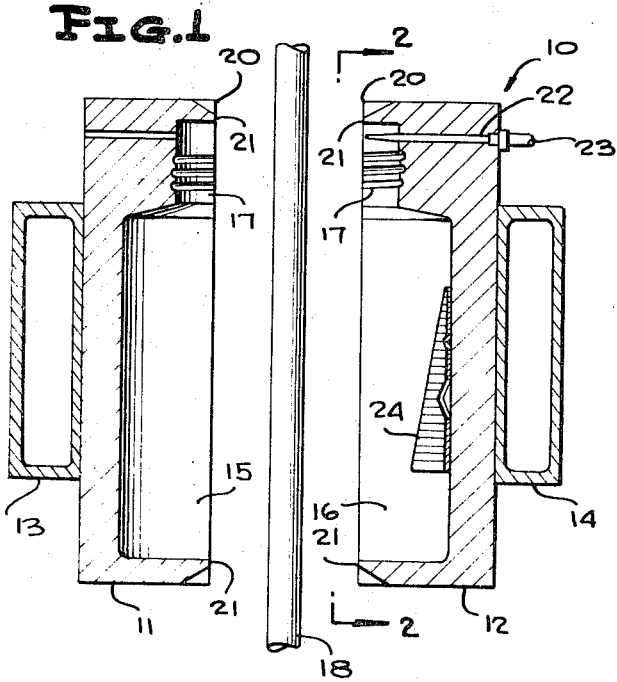
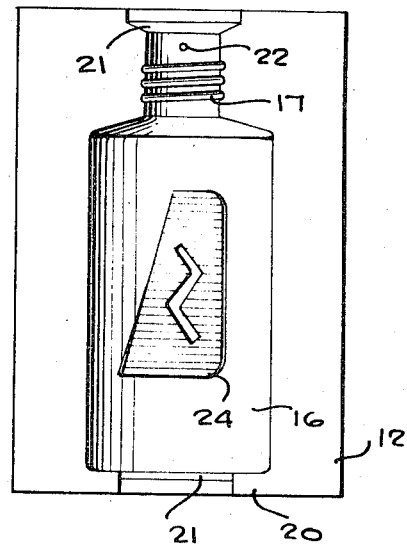
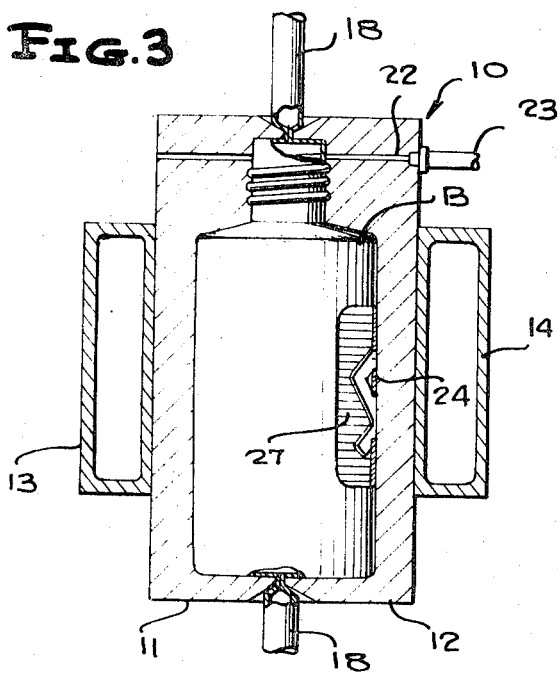
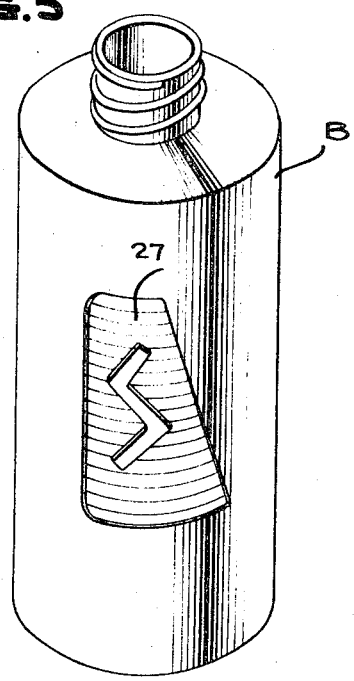
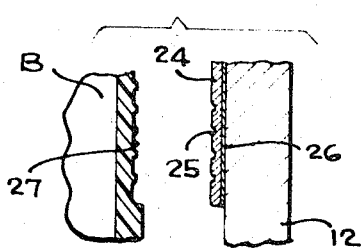

3,550,197
MOLDS FOR BLOWING ENGRAVED APPEARING BOTTLES WITHOUT THE USE OF ENGRAVED MOLDS
John L. Szajna, Norridge, and Ronald G. Lump, Des Plaines, Ill., assignors to Continental Can Company, Inc., New York, N.Y., a corporation of New York
Continuation-in-part of application Ser. No. 57,994, Sept. 23, 1960. This application Aug. 17, 1964, Ser. No. 391,068
Int. Cl. B29c *17/07*
U.S. Cl. 18—5                                                3 Claims

ABSTRACT OF THE DISCLOSURE

This invention relates in general to new and useful improvements in the art of forming molded articles by blow molding such articles within molds, and more particularly relates to a novel mold construction and the method of utilizing such mold construction to produce bottles and like articles having an engraved appearance without requiring the use of engraved molds.

---

This application is a continuation-in-part of our copending application Ser. No. 57,994, filed Sept. 23, 1960, now abandoned.

In many instances, it is desired to provide bottles, particularly plastic bottles, with surface ornamentation. When the bottles are molded, as are most plastic bottles, it is necessary that the mold be engraved to produce the desired surface ornamentation on the bottle or other article being formed. It will be readily apparent that the cost of engraving a mold is very high. This, however, is only one of the disadvantages. In the first place, most molding machines are provided with a plurality of molds, and for practical purposes, it is expeditious to mold only one type of bottle at a time in the machine. Therefore, it is necessary that the machine be provided with a plurality of identical engraved molds, thus greatly multiplying the cost. Secondly, an engraved mold is suitable for molding only one article, and when it is desired to mold other articles, it is necessary that the mold be changed and the mold has no utility until it is again desired to mold additional quantities of the article. On the other hand, it is highly desirable to be able to produce for individual customers molded bottles and like articles having surface ornamentations of the customer's own design. A further problem encountered in the molding of plastic articles, particularly bottles, within a mold is that the plastic material flows into any fine crack or crevice in the mold with the result that each parting line in the mold appears on the finished article. It is therefore necessary that the molds be so constructed wherein they have parting lines only at the joints between the mold halves.

It is therefore, the primary object of this invention to provide a novel insert which is of an extremely simple formation whereby it may be inexpensively formed, the mold insert being capable of converting a smooth finished mold half into one which is capable of forming an engraved appearing surface on a bottle formed within the mold, the insert being capable of multiple re-use, and at the same time being removable from the mold half without disfiguring the smooth surface of the mold half in any manner whatsoever.

Still another object of this invention is to provide a novel insert which may be placed into existing smooth surface molds for converting such smooth surface molds to molds which will produce articles having engraved appearing surfaces, the insert being readily secured in place by a suitable adhesive which may be also readily removed after the necessary run of articles has been produced in the mold so that the mold may either be reconverted for molding smooth surface articles, or other inserts of different designs may be placed therein for producing articles having other surface configurations.

With the above, and other objects in view that will hereinafter appear, the nature of the invention will be more clearly understood by reference to the following detailed description, the appended claims and the several views illustrated in the accompanying drawing:

In the drawing:
FIG. 1 is a vertical sectional view taken through a mold used for the purpose of forming a bottle from a plastic tube through a blow molding process, the mold being in its open position and the plastic tube to be blown within the mold being positioned between the two halves of the mold.

FIG. 2 is an elevational view taken along the line 2—2 of FIG. 1, and shows the configuration of one mold half, the mold half having the insert thereon which converts the smooth finish mold to a mold for producing bottles having surface configurations.

FIG. 3 is a vertical sectional view similar to FIG. 1, and shows the mold in its closed position, with the plastic tube therein blown to form the desired bottle.

FIG. 4 is an enlarged fragmentary exploded sectional view showing a section of the mold with the insert thereon and a section of the bottle with a surface configuration impressed upon the bottle to produce the desired engraved appearing configuration of the bottle.

FIG. 5 is an enlarged perspective view showing the finished bottle, including the surface configuration produced thereon.

Reference is now made to the drawings, wherein there is illustrated a conventional mold, generally referred to by the numeral 10, for the purpose of blow molding a plastic bottle from a plastic tube. The mold 10 and the process of molding a bottle therein are fully disclosed in the patent to Reukburg, Pat. No. 2,579,399, granted Dec. 18, 1951.

The mold 10 is formed of a pair of halves 11, 12 which are supported by a pair of shoes 13, 14, respectively, for movement between open and closed positions. The mold halves 11, 12 are provided with cavities 15, 16 in which bottles may be blown. Each of the cavities 15, 16 has a continuous smooth wall surface which normally defines one half of a body of a bottle. The upper portion of each cavity 15, 16 is configurated, as at 17, to form a threaded neck on the bottle.

As is best shown in FIGS. 1 and 3, the plastic material from which the finished bottle is formed is delivered in the form of a relatively thick wall plastic tube 18. The tube 18 is extruded in a conventional manner and passes down between the open mold halves 11, 12, as is best shown in FIG. 1. Each of the mold halves 11, 12 has a meeting face 20 to facilitate the closing of the mold halves to form the mold 10. The meeting face 20 of each mold half 11, 12 is provided at the ends thereof with pressure surfaces 21 for engaging the plastic tube 18 and pinching off remote portions thereof in the manner best illustrated in FIG. 3. Thus, when the mold halves 11, 12 are moved from their open positions of FIG. 1 to their closed positions of FIG. 3, remote portions of the plastic tube 18 are pinched together to effect an intermediate sealed portion.

The mold half 12 is also provided with a needle 22 to which there is connected a compressed air line 23. When the mold halves 11, 12 move to their closed positions of FIG. 3, the needle 22 projects into the plastic tube 18. After the mold halves 11, 12 have been closed, compressed air is introduced into the plastic tube 18, the material of which is relatively warm so that it is soft, with the result that the plastic tube is blown or expanded into engagement with the surfaces of the mold 10 and the plastic tube assumes a configuration corresponding to that of the interior of the mold 10. Because of the cost factor, the cavities of the mold 10 are smooth and the resultant bottle B formed within the mold 10 has smooth walls except for a parting line which coincides with the joint between the meeting faces 20 of the mold halves 11 and 12.

At this time it is pointed out that the packaging of products has progressed beyond the point where a container is solely functional. In order that a container, such as a bottle, may be acceptable to a packager for the ultimate packaging of a product for consumption by the general public, the container must have a pleasing appearance. Accordingly, when plastic bottles are formed, it is desirable to retain the deficiencies in surface finish thereof to a minimum. Therefore, even the parting lines found on smooth surface plain plastic bottles are often objectionable and are definitely maintained at a minimum. As a result, mold halves for forming a plain, smooth surface bottle must be completely free of surface defects of any kind which will produce irregularities in the surface of the bottles formed therein. This invention was conceived only after this was firmly fixed in mind.

In accordance with this invention, it is proposed to provide means for readily modifying the cavity wall surface of the mold 10 in a manner to permit the forming of bottles having desired surface configurations without in any manner whatsoever requiring the permanent deformation of the wall surfaces of the mold 10. To this end, there is provided an insert 24, which is best illustrated in FIG. 2. The insert 24 is secureable to the smooth surface wall of the cavity of one of the mold halves 11, 12 in spaced relation to the parting wall 20 thereof. Although the insert 24 is illustrated as being secured to the mold half 12, it may equally as well be secured to the mold half 11 or inserts may be secured to both mold halves.

Reference is particularly made to FIG. 4, wherein it is shown that the insert 24 has a surface configuration 25 which is three-dimensional. This surface configuration is complemental to the desired surface configuration of a corresponding portion of the bottle B to be formed. It is also to be pointed out that the insert 24 is readily secured to the smooth surface of the mold half 12 by means of a suitable adhesive 26. The adhesive may be one of many types of adhesive, but requires an ability to withstand the heat involved during the molding process and at the same time must be one which may be readily removed by means of a solvent or like adhesive removing means to facilitate the removal of the insert 24.

As is best shown in FIGS. 4 and 5, when the bottle B is blown in the mold 10 with the insert 24 disposed therein an impression 27 is formed in the surface of the material of the bottle B with the impression 27 having a surface configuration of an engraved appearance. Thus, it will be readily apparent that through the use of a very simple insert, such as the insert 24, a conventional smooth surface mold, such as the mold 10, may be quickly and inexpensively converted to product bottles and like articles having surface configurations of an engraved appearance.

It is not intended to restrict the invention to a particular type of material for the insert. However, successful experimentation has been carried out with an insert formed of Mylar (terephthalic acid-ethylene glycol polymer) with a metallized surface. The basic requirements of the insert material is that it does not adhere to the relatively soft plastic during the blowing operation and is formed of a material which may be readily worked and has a smooth surface finish.

It is to be understood that the material for the inserts 24 may be provided in sheet form and the like and the necessary configuration of the insert formed by a simple stamping operation which may be readily repeated to produce the required number of inserts. The cost of the insert material is relatively low, and therefore, the insert may be produced at a very small cost.

It will be readily apparent that the mold 10 is particularly configurated to form a smooth surfaced bottle B which has the smooth surface of the body thereof interrupted only by the necessary parting line formed due to the joint between the two halves 11, 12 of the mold. Such a bottle is suitable for packaging materials in a normal manner. However, it has no personal appeal to a purchaser of the product, and as a result, would normally be utilized only when the product being dispensed is of the type wherein the container would have no personal appeal. Such a bottle would be made for the general packager.

When a packager desires a personalized bottle of the size and general configuration of the bottle which can be formed within the mold 10, the bottle manufacturer can readily modify the mold 10 to produce the personalized bottle by merely inserting in the mold one of the inserts 24. Since the insert 24 is readily securable to the smooth surface of each of the mold halves 11, 12, it will be readily apparent that the design 27 formed by the insert 24 can be spaced a maximum distance away from the parting line formed on the bottle B and therefore, the ornamental appearance of the bottle is in no way disfigured by the existence of the parting line. It will be readily apparent that it is essential that the insert 24 be securable to the smooth surface of the mold half in that if it were necessary to place the insert 24 adjacent the edge of the mold half, the ornamental design imparted by the insert 24 to the blown bottle would be distorted by the parting line.

After the desired run of the particular design of bottle has been completed, it is merely necessary to open the molds 10 of the molding machine and remove the inserts 24 therefrom. This is normally accomplished by means of a suitable solvent for the adhesive 26. After the inserts 24 have been removed from the molds, the molds are automatically restored to their normal conditions and are ready for the blow molding of additional smooth surface bottles. On the other hand, if it is now desired to run off a quantity of another design of bottle, it is merely necessary to replace the removed insert 24 with an insert of a different design.

It will be readily apparent that the placing and removal of the insert 24 from a mold in no way distorts or disfigures the smooth surface configuration of the mold. Therefore, it will be readily apparent that the insert is feasible from a practical standpoint and that it has a great commercial advantage.

Not only is the present invention advantageous from a cost standpoint on a production basis, but it is also highly desirable for arriving at desirable surface configuration designs. On a test basis, a series of inserts may be formed or the same insert modified as required until a suitable design has been developed. This all can be accomplished at a very low cost since it is merely necessary to replace the insert or to modify the insert after the formation of each article in order to determine the resultant appearance of the article and the arriving at a final design.

From the foregoing, it will be seen that novel and advantageous provision has been made for carrying out the desired end. However, attention is directed to the fact that variations may be made in the example method and apparatus disclosed herein without departing from the spirit and scope of the invention, as defined in the appended claims.

We claim:

1. An insert for converting a mold having a smooth molding surface to produce articles having an engraved appearing surface, said insert including a plastic base and metallic surface layer on one face of said base, the surface of said metallic surface layer being configurated complementary to the desired molded surface, and an adhesive on the base remote from said metallic surface layer for securing the insert within a mold.

2. An insert for converting a mold smooth molding surface into a three-dimensional contoured surface, said insert presenting a metallic molding surface and having a rear surface with an adhesive thereon for securing said insert in a mold, said insert being flexible for readily conforming to a mold surface.

3. An insert for converting a mold having a smooth molding surface to produce articles having an engraved appearing surface, said insert including a plastic base and metallic surface layer on one face of said base, said insert having a decorative outline and the surface of said metallic surface layer being decoratively configured complementary to the desired mold surface, and an adhesive on the base remote from said metallic surface layer for securing the insert within a mold.

References Cited
UNITED STATES PATENTS

| | | | |
|---|---|---|---|
| 1,744,438 | 1/1930 | Benson | 18—5(B) |
| 1,969,083 | 8/1934 | Lawson | 18—5(B) |
| 2,032,845 | 3/1936 | Humphner | 117—68.5 |
| 2,632,202 | 3/1953 | Haines | 264—98 |
| 2,734,007 | 2/1956 | Youlmin | 117—68.5 |
| 2,779,057 | 1/1957 | Graham et al. | |
| 2,789,381 | 4/1957 | Belgard. | |
| 2,904,918 | 9/1959 | Frank | 117—68.5 |

ROBERT F. WHITE, Primary Examiner

A. M. SOKAL, Assistant Examiner

U.S. Cl. X.R.

249—104; 264—94

PO-1050
(5/69)

UNITED STATES PATENT OFFICE
CERTIFICATE OF CORRECTION

Patent No. 3,550,197    Dated December 29, 1970

Inventor(s) JOHN L. SZAJNA and RONALD L. LUMP

It is certified that error appears in the above-identified patent and that said Letters Patent are hereby corrected as shown below:

On the drawing sheet, read the title of the invention as -- MOLDS FOR BLOWING ENGRAVED APPEARING BOTTLES WITHOUT THE USE OF ENGRAVED MOLDS --

Signed and sealed this 23rd day of March 1971.

(SEAL)
Attest:

EDWARD M. FLETCHER, JR.
Attesting Officer

WILLIAM E. SCHUYLER, JR.
Commissioner of Patents